US010509895B2

(12) United States Patent
Aronowitz et al.

(10) Patent No.: US 10,509,895 B2
(45) Date of Patent: *Dec. 17, 2019

(54) BIOMETRIC AUTHENTICATION (71) Applicant: International Business Machines Corporation, Armonk, NY (US)

(72) Inventors: Hagai Aronowitz, Petah-Tikva (IL); Amir Geva, Yokneam (IL); Ron Hoory, Ramat Yishay (IL); David Nahamoo, Great Neck, NY (US); Jason William Pelecanos, Ossining, NY (US); Orith Toledo-Ronen, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 928 days.

This patent is subject to a terminal disclaimer.

(21) Appl. No.: 15/064,632

(22) Filed: Mar. 9, 2016

(65) Prior Publication Data

US 2016/0188863 A1 Jun. 30, 2016

Related U.S. Application Data (63) Continuation of application No. 14/172,928, filed on Feb. 5, 2014, now Pat. No. 9,405,893.

(51) Int. Cl.
*G06F 21/32* (2013.01)
*G06K 9/00* (2006.01)
(Continued)

(52) U.S. Cl.
CPC ......... *G06F 21/32* (2013.01); *G06K 9/00892* (2013.01); *G06K 9/629* (2013.01); *G06N 20/00* (2019.01)

(58) Field of Classification Search
CPC ...... G06F 21/32; G06K 9/00; G06K 9/00087; G06K 9/00154; G06K 9/00288;
(Continued)

(56) References Cited

U.S. PATENT DOCUMENTS

| 5,730,468 A | * | 3/1998 | Wirtz | G07C 9/0015 283/45 |
| 6,957,770 B1 | * | 10/2005 | Robinson | G06Q 20/04 235/375 |

(Continued)

FOREIGN PATENT DOCUMENTS

WO 2010047685 4/2010

OTHER PUBLICATIONS

Jain A. et al., "An Introduction to Biometric Recognition", IEEE Transactions on Circuits and Systems for Video Technology, vol. 14, No. 1, Jan. 2004. (Previously supplied). (Year: 2004).*

(Continued)

*Primary Examiner* — Dave Misir
(74) *Attorney, Agent, or Firm* — Dvir Gassner (57) ABSTRACT

A method comprising using at least one hardware processor for: providing a set of development supervectors representing features of biometric samples of multiple subjects, the biometric samples being of at least a first and a second different biometric modalities; providing at least a first and a second enrollment supervectors representing features of at least a first and a second enrollment biometric samples of a target subject correspondingly, wherein the at least first and second enrollment samples are of the at least first and the second different biometric modalities correspondingly; providing at least a first and a second verification supervectors representing features of at least a first and a second verification biometric samples of the target subject correspondingly, wherein the at least first and second verification
(Continued)

samples are of the at least first and second different biometric modalities correspondingly; concatenating the development supervectors to a set of development generic supervector, the at least first and second enrollment supervectors to a single enrollment generic supervector and the at least first and second verification supervectors to a single verification generic supervector; and verifying an identity of the target subject based on a fused score calculated for the verification generic supervector, wherein the fused score is calculated based on the enrollment generic supervector and the set of development generic supervectors.

10 Claims, 5 Drawing Sheets (51) Int. Cl.
G06N 20/00 (2019.01)
G06K 9/62 (2006.01)
(58) Field of Classification Search
CPC .... G06K 9/00892; G06K 9/629; G06N 99/00; G06N 99/005; G06N 20/00
USPC .............................................. 706/12; 726/19
See application file for complete search history.

(56) References Cited

U.S. PATENT DOCUMENTS

| | | | |
|---|---|---|---|
| 7,362,884 B2 | 4/2008 | Willis et al. | |
| 7,606,396 B2 | 10/2009 | Miller et al. | |
| 7,929,733 B1 | 4/2011 | Lehnert et al. | |
| 8,255,698 B2 | 8/2012 | Li et al. | |
| 8,340,361 B2 | 12/2012 | Murakami et al. | |
| 2005/0039015 A1* | 2/2005 | Ladanyi | G06K 9/00154 713/176 |
| 2005/0238207 A1* | 10/2005 | Tavares | G06K 9/00885 382/115 |
| 2007/0172114 A1* | 7/2007 | Baker | G06K 9/6296 382/160 |
| 2007/0230791 A1* | 10/2007 | Chellapilla | G06K 9/00422 382/188 |
| 2008/0115981 A1* | 5/2008 | Bechtel | G06F 3/03545 178/19.01 |
| 2009/0171623 A1* | 7/2009 | Kiefer | G06N 99/005 702/181 |
| 2009/0289760 A1* | 11/2009 | Murakami | G06K 9/6277 340/5.82 |
| 2010/0128936 A1* | 5/2010 | Baughman | G06K 9/00885 382/116 |
| 2010/0228692 A1 | 9/2010 | Guralnik et al. | |
| 2010/0312763 A1 | 12/2010 | Peirce | |
| 2011/0106734 A1* | 5/2011 | Boult | G06F 11/0751 706/12 |
| 2011/0182480 A1* | 7/2011 | Murakami | G06K 9/00885 382/115 |
| 2011/0221567 A1* | 9/2011 | Lehnert | G06K 9/00677 340/5.82 |
| 2011/0271120 A1* | 11/2011 | Kevenaar | H04L 9/3231 713/189 |
| 2013/0036309 A1* | 2/2013 | Kevenaar | G06F 21/32 713/186 |
| 2013/0083975 A1 | 4/2013 | Partington et al. | |
| 2013/0268563 A1* | 10/2013 | Shiell | G06F 17/30 707/797 |
| 2014/0165185 A1* | 6/2014 | Lange | G06K 9/00892 726/19 |
| 2014/0283005 A1* | 9/2014 | Avni | G06F 21/64 726/16 |
| 2014/0297528 A1* | 10/2014 | Agrawal | G06Q 20/40145 705/44 |

OTHER PUBLICATIONS

Kholmatov A. et al., "Biometric Authentication Using Online Signatures", ISCIS 2004, LNCS 3280, pp. 373-380, 2004. (Previously supplied). (Year: 2004).*
Wang F. et al., "Multimodal biometric authentication based on score level fusion using support vector machine", OPTO-Electronics Review, 17(1), pp. 59-64, 2009. (Previously supplied). (Year: 2009).*
Kholmatov A. et al., "Identity authentication using improved online signature verification method", Pattern Recognition Letters, 26, 2005, pp. 2400-2408. (Previously supplied). (Year: 2005).*
Ross et al., "information Fusion in Biometrics", Pattern Recognition Letters 24 (13), pp. 2115-2125, 2003,
Snelick et al., "Large-scale evaluation of multimodal biometric authentication using state-of-the-art systems", IEEE Trans. On Pattern Analysis and Machine Intelligence, vol. 27, Issue 3, 2005, pp. 450-455.
Conti et al.,"A Frequency-based Approach for Features Fusion in Fingerprint and Iris Multimodal Biometric Identification Systems", IEEE Trans. On Systems, Man, and Cybernetics, Part C: Application and Reviews, vol. 40, Issue 4, 2010, pp. 384-395.
Khalifa et al., "Bimodal biometric verification with different fusion levels" , 6th International Multi-Conference on Systems, Signals and Devices, 2009 (SSD '09), pp. 1-6.
Yao et al.,"Face and palmprint feature level fusion for single sample biometrics recognition", Neurocomputing vol. 70, Issues 7-9, Mar. 2007, pp. 1582-1586.
Raghavendra et al., "Designing efficient fusion schemes for multimodal biometric systems using face and palmprint", Pattern Recognition, vol. 44, Issue 5, May 2011, pp. 1076-1088.
Ross et al., "Feature Level Fusion in Biometric Systems", Oct. 2006. Can be found at: http://researchweb.iiit.ac.in/~vandana/PAPERS/MMB/featureFusion.pdf.
Ross et al., "Feature Level fusion of hand and face biometricts", Proc. SPIE 5779, Biometric Technology for Human Identification II, 196 , Mar. 2005.
Abdolahi et al., "Multimodal Biometric system Fusion Using Fingerprint and Iris with Fuzzy Logic", International Journal of Soft Computing and Engineering (IJSCE), ISSN: 2231-2307, vol. 2, Issue-6, Jan. 2013.
Jain et al., "A multimodal biometric system using fingerprint, Face and Speech", 2nd Int'l Conference on Audio- and Video-based Biometric Person Authentication, Washington D.C., pp. 182-187, Mar. 22-24, 1999.

* cited by examiner

BIOMETRIC AUTHENTICATION

CROSS-REFERENCE TO RELATED APPLICATIONS

This application is a continuation of U.S. patent application Ser. No. 14/172,928, filed May 2, 2014, which is titled "BIOMETRIC AUTHENTICATION" the application of which is incorporated herein by this reference as though fully set forth herein.

BACKGROUND

The present invention relates to the field of biometric authentication.

Biometric authentication systems and methods may use one or more modalities such as face recognition, speaker recognition, signature or gesture authentication, fingerprint identification, etc. The input of each modality is different and has different characteristics. For example, in face recognition the input is images of the face, for speaker recognition the input is the person's voice, while the input for chirographic authentication includes handwriting, dynamic signatures, or gesture. According to the common approach, a dedicated system is developed for each such modality based on technology that has been developed specifically for that modality. Thus, gaps have been formed between state-of-the-art technologies for different modalities. For example, the state-of-the-art technology for chirography authentication is relatively much less developed due to relative fewer researchers working on that modality.

In particular, online chirographic authentication is the task of authenticating an identity of a user using an online written input, such as a personal signature or a common or prompted phrase, according to the characteristics of the user's handwriting. There are many approaches for addressing this task. However, the use of a private signature is prone to forgery, and the authentication of common or prompted phrases is generally considered a difficult task with typical low accuracy.

Known methods and systems of multimodal biometric, i.e., fusing multiple biometric modalities, are generally focused in fusion at the score-level. Fusion in other, more preliminary levels, such as the feature-level, is commonly applied on two compatible modalities, such as two input images.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: providing a set of development supervectors representing features of biometric samples of multiple subjects, the biometric samples being of at least a first and a second different biometric modalities; providing at least a first and a second enrollment supervectors representing features of at least a first and a second enrollment biometric samples of a target subject correspondingly, wherein the at least first and second enrollment samples are of the at least first and the second different biometric modalities correspondingly; providing at least a first and a second verification supervectors representing features of at least a first and a second verification biometric samples of the target subject correspondingly, wherein the at least first and second verification samples are of the at least first and second different biometric modalities correspondingly; concatenating the development supervectors to a set of development generic supervector, the at least first and second enrollment supervectors to a single enrollment generic supervector and the at least first and second verification supervectors to a single verification generic supervector; and verifying an identity of the target subject based on a fused score calculated for the verification generic supervector, wherein the fused score is calculated based on the enrollment generic supervector and the set of development generic supervectors.

There is further provided, in accordance with an embodiment, a method for mapping a dynamic chirographic sample to a fixed metric vector space, the method comprising using at least one hardware processor for: providing a dynamic chirographic sample of a target subject; providing a reference model for the dynamic chirographic sample; aligning the dynamic chirographic sample of the target subject to the reference model; and generating a chirographic supervector based on the aligned dynamic chirographic sample of the target subject, wherein the supervector represents features of the dynamic chirographic sample of the target subject mapped in a fixed metric vector space.

There is yet further provided, in accordance with an embodiment, a method for generic mapping of an enrollment or a verification vector to a supervector space, the enrollment or verification vector representing an enrollment or a verification sample correspondingly of a biometric input of a subject, the method comprising using at least one hardware processor for: providing a scoring function for the biometric input, the scoring function configured to receive an enrollment sample and a verification sample and to provide a score; providing a development set for the biometric input, the development set comprising a plurality of development enrollment samples and a plurality of development verification samples of a plurality of subjects; defining development enrollment vectors, each comprising scores provided by the scoring function for one development enrollment sample of the plurality of development enrollment samples and each development verification sample of the plurality of development verification samples; defining development verification vectors, each comprising scores provided by the scoring function for one development verification sample of the plurality of development verification samples and each development enrollment sample of the plurality of development enrollment samples; computing an enrollment or a verification projection matrix correspondingly representing a linear projection of an enrollment or a verification vector to a linear supervector subspace; multiplying the enrollment or verification vector by the enrollment or verification projection matrix correspondingly to receive an enrollment or verification supervector correspondingly representing the biometric input in the supervector space.

In some embodiments, the verifying of an identity of the target subject comprises: training a classifier for the verification generic supervector based on the set of development generic supervector; and applying the classifier on the verification generic supervector to receive said calculated fused score.

In some embodiments, said training of the classifier is performed by using one or more machine learning methods.

In some embodiments, the one or more machine learning methods is selected from the group consisting of: Probabilistic Linear Discriminant Analysis (PLDA), Support Vector Machines, joint factor analysis and deep belief networks (DBNs).

In some embodiments, the training of the classifier comprises learning correlations between said features of said biometric samples of said first and second biometric modalities.

In some embodiments, the training and the applying of the classifier comprise identifying statistical significance of said features of said first and second enrollment biometric samples of said first and second biometric modalities correspondingly of said target subject.

In some embodiments, the at least first and second different biometric modalities comprise three different biometric modalities, the at least first and second enrollment supervectors comprises three enrollment supervectors representing features of three enrollment biometric samples of the target subject, and the at least first and second verification supervectors comprises three verification supervectors representing features of three verification biometric samples.

In some embodiments, the biometric modality is selected from the group consisting of: chirography, face, voice, and fingerprint.

In some embodiments, the generating of the chirographic supervector is performed by utilizing a Dynamic-Time-Warping (DTW) algorithm.

In some embodiments, the dynamic chirographic sample is selected from the group consisting of: signature; handwriting and gesture.

In some embodiments, the dynamic chirographic sample of the target subject is a dynamic signature of the target subject and the reference model is a reference signature correspondingly.

In some embodiments, the reference signature is an estimated Universal-Background-Signature (UBS), the method further comprising: providing a development set comprising a plurality of dynamic chirographic samples of a plurality of subjects; setting the UBS to a predefined time length; linearly segmenting the plurality of dynamic chirographic samples of the development set to achieve the predefined time length; estimating an initial UBS based on the linearly segmented plurality of dynamic chirographic samples; and iteratively refining the UBS by utilizing an Expectation-Maximization (EM) algorithm.

In some embodiments, the dynamic signature of the target subject is provided by using a digital pen and a digital paper.

In some embodiments, the iteratively refining of the UBS comprises: providing a UBS initial estimation; iteratively calculating a Maximum Likelihood (ML) segmentation for each dynamic chirographic sample of the plurality of dynamic chirographic samples of the development set based on the DTW algorithm; and iteratively estimating the UBS based on the calculated ML segmentation.

In some embodiments, said computing of an enrollment or a verification projection matrix correspondingly is performed by applying Linear Discriminant Analysis on a between class covariance matrix and on a within class covariance matrix of the development enrollment vectors or of the development verification vectors correspondingly.

In some embodiments, the method further comprises using the at least one hardware processor for: generating the enrollment vector from the enrollment sample, wherein the enrollment vector comprises scores provided by the scoring function for the enrollment sample and development verification samples of the plurality of development verification samples; and generating the verification vector from the verification sample, wherein the verification vector comprises scores provided by the scoring function for the verification sample and development enrollment samples of the plurality of development enrollment samples.

In some embodiments, the method further comprises using the at least one hardware processor for: multiplying each of the development enrollment vectors by the projection matrix of the development enrollment vectors to receive development enrollment supervectors, each of the development enrollment supervectors representing each of the development enrollment samples in the subspace; and multiplying each of the development verification vectors by the verification projection matrix to receive development verification supervectors, each of the development verification supervectors representing each of the development verification samples in the subspace.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Glossary

The term "dynamic", as referred to herein with respect to an input or a sample, refers to an input or a sample which is recorded in real-time (or online) and includes temporal information.

The term "supervector", as referred to herein may refer to a vector in a high-dimensional vector space, on which a distance is defined.

The terms "biometric input" and "biometric sample", as referred to herein, may be interchangeably used. The terms may relate to the provision of a biometric input or sample by a subject to a computerized device or system (i.e., including at least one hardware processor). Furthermore, the terms may relate to the computer file which represents the input or sample as computer readable data, stored and used by such a computerized device or system.

The term "chirographic" as referred to herein with respect to a biometric modality, input or sample, may include, for example, handwriting, signature and/or gesture.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or Hock diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Fusion of Biometric Modalities

Figure 1:
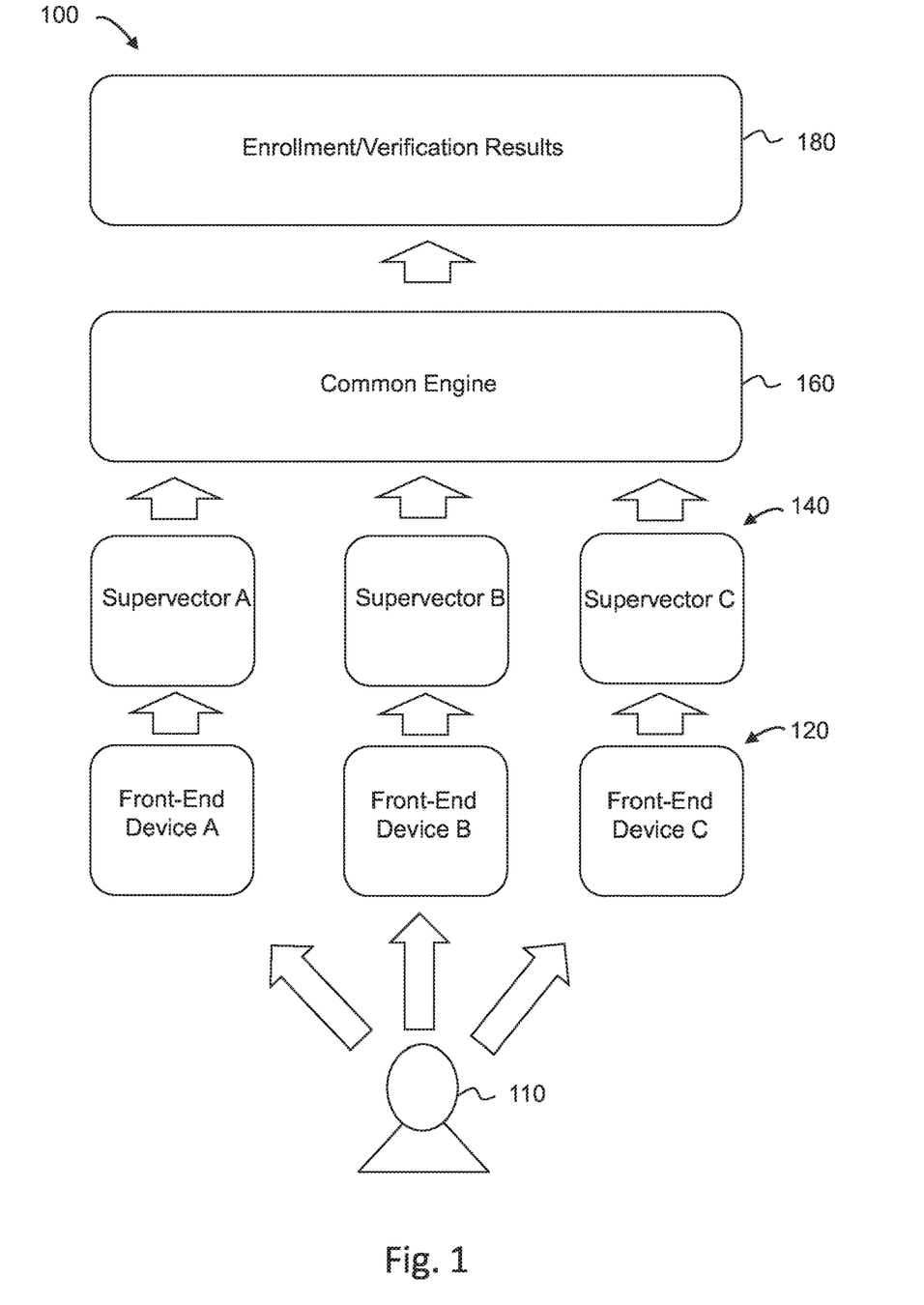
FIG. 1 shows a diagram illustrating the operation of an exemplary system for multimodal biometric authentication, constructed and operative in accordance with an embodiment of the disclosed technique.

FIG. 1 shows a diagram illustrating the operation of an exemplary system 100 for multimodal biometric authentication, constructed and operative in accordance with an embodiment of the disclosed technique. Authentication of an identity of a target user 110 is desired. In order to allow that, user 110 may provide a biometric input to any one of front-end devices 120 (i.e., front-end device A, front-end device B or front-end device C) or to a combination thereof. Each of front-end devices 120 may be configured to receive a biometric input of a different biometric modality. For example, front-end device A may be configured to receive a vocal input, e.g., by recording user 110 uttering a prompted text. Front-end device B may be configured to receive a facial input, e.g., by acquiring an image of the face of user 110. Front-end device C may be configured to receive a dynamic chirographic input, such as a signature.

A biometric input obtained from user 110 may be performed in an enrollment phase or a verification phase of the authentication procedure. Generally, in an enrollment phase, a biometric input may be obtained from a user and stored as a reference sample (will be referred herein below as an enrollment input or an enrollment sample). Thus, enrollment may be generally performed once for each user and for each type of biometric modality. In a verification phase, a user wishes to be identified and provides a further biometric input, which will be referred herein below as a verification input or a verification sample. In order to verify and identity of an enrolled user, system 100 compares or matched an enrollment sample of the user to his currently provided verification sample and of the same biometric modality. Since system 100 is a multimodal system, user 110 may provide multiple verification samples of multiple modalities, while the verification may be performed based on matching of all of the provided verification samples to the corresponding enrollment samples.

After the biometric inputs of user 110 are received, each front-end device 120 may perform pre-processing and feature extraction for each received biometric input correspondingly, as known in the art. Each front-end device 120 then generates a supervector 140 representing the extracted features of each received biometric input correspondingly. Thus, supervector A represents the features of the biometric input received by front-end device A, e.g., vocal features. Supervector B represents the features of the biometric input received by front-end device B, e.g., facial features. Supervector C represents the features of the biometric input received by front-end device C, e.g., chirographic features. Each front-end device 120 provides its generated supervector 140 to a common engine 160.

Common engine 160 performs the authentication of user 110 by matching, for each modality, a verification sample to an enrollment sample. Generally, common engine 160 performs modeling and scoring (also known as classification or matching) of supervectors 140 and in a common manner for all of the different modalities. Common engine 160 may apply known machine learning techniques for modeling and scoring in a generic way of inputs of different modalities (i.e., represented by the different supervectors). Thus, common engine 160 may perform fusion of inputs of different modalities at the feature level, since scoring may be performed with respect to all of the features of the different modalities at once. In case a verification of user 110 is required, common engine 160 then may determine, based on the aforementioned scoring, if an identity of user 110 is authenticated or not. In case an enrollment of user 110 is performed, the enrollment data may be used by common engine 160 to create a model for the user which will be used during the verification phase (i.e., modeling). Common engine 160 provides results 180, i.e., positive or negative authentication notice in case of verification. By 'negative' authentication it is meant that an identity of the user could not be verified.

Figure 2:
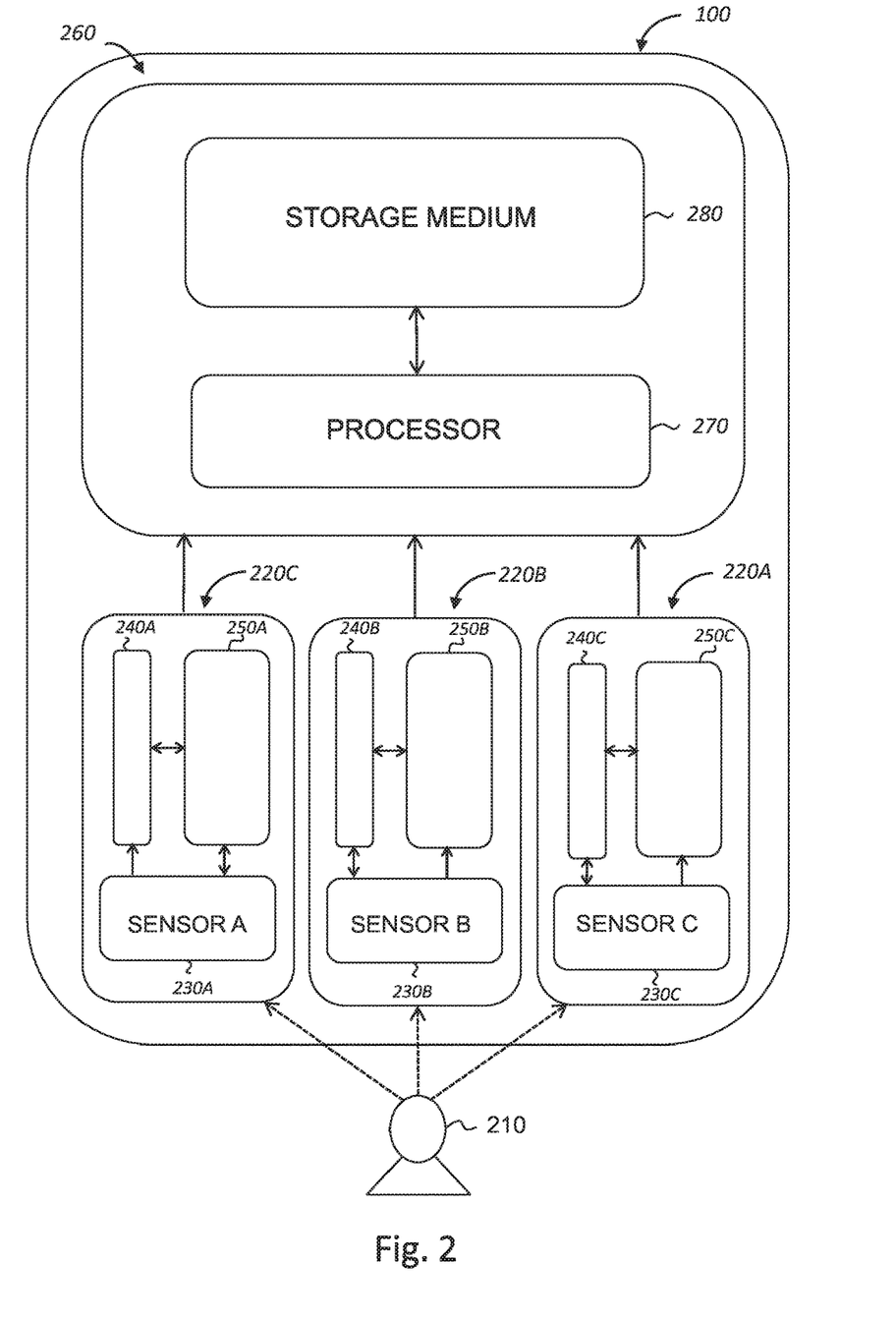
FIG. 2 shows a schematic illustration of the system of FIG. 1, constructed and operative in accordance with yet another embodiment of the disclosed technique.

FIG. 2 shows a schematic illustration of system 100 of FIG. 1, constructed and operative in accordance with yet another embodiment of the disclosed technique. System 100 includes a first front-end device 220A, a second front-end device 220B, a third front-end device 220C and a common engine 250.

Front-end device 220A includes a sensor 230A (also indicated as sensor A), a frond-end hardware processor 240A and a storage medium 250A. Sensor 230A and storage medium 250A may be coupled with processor 240A. Sensor 230A may be also coupled with storage medium 250A. Front-end device 220B includes a sensor 230B (also indicated as sensor B), a frond-end hardware processor 240B and a storage medium 250B. Sensor 230B and storage medium 250B may be coupled with processor 240B. Sensor 230B may be also coupled with storage medium 250B. Front-end device 220C includes a sensor 230C (also indicated as sensor C), a frond-end hardware processor 240C and a storage medium 250C. Sensor 230C and storage medium 250C may be coupled with processor 240C. Sensor 230C may be also coupled with storage medium 250C. Common engine 260 includes an engine hardware processor 270 coupled with a storage medium 280. Front-end devices 220A, 220B and 220C may be couples with common engine 260.

Front-end device 220A may be configured to receive biometric samples via sensor A of a first biometric modality, such as voice samples via a voice recorder. Front-end device 220B may be configured to receive biometric samples via sensor B of a second biometric modality, such as face samples via an image acquisition device. Front-end device 220C may be configured to receive biometric samples via sensor C of a third biometric modality, such as chirographic samples via a digital pen and paper.

Processors 240A, 240B and 240C may be configured to generate supervectors according to the disclosed technique, each representing features of a biometric sample obtained from a user 210 via sensors A, B and C correspondingly. A designated software may be stored on each of storage mediums 250A, 250B and 250C to be utilized by processors 240A, 240B and 240C correspondingly to generate the appropriate supervectors. Common engine 250 may be generally configured to receive supervectors from one or more of front-end devices 220A, 220B and 220C and authenticate or verify an identity of user 210.

Figure 3:
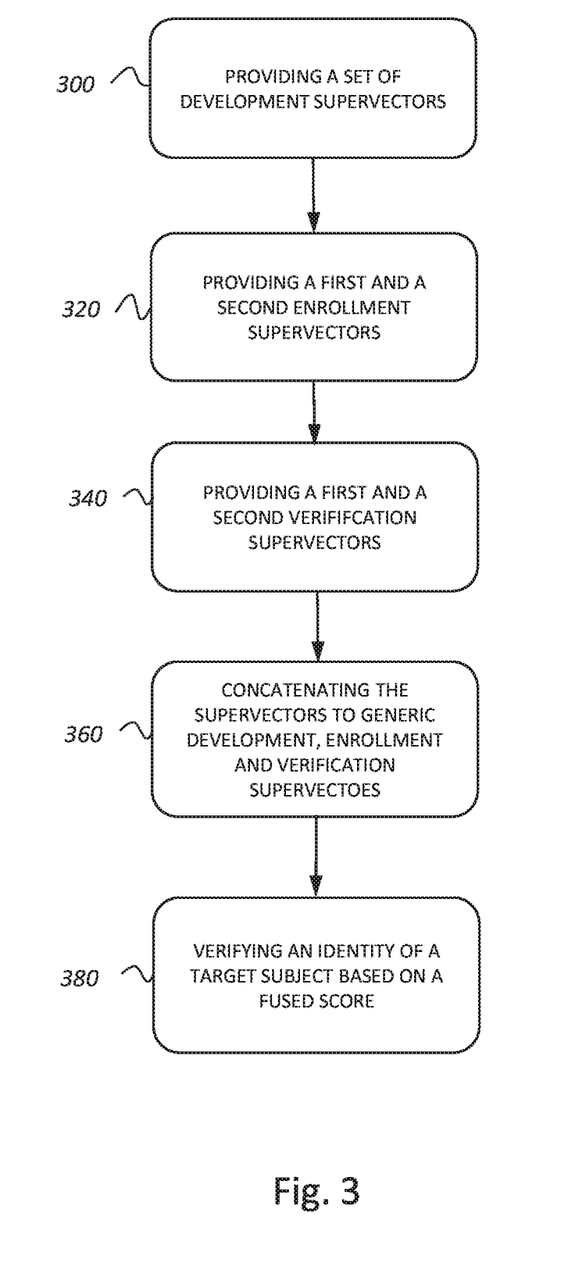
FIG. 3 shows a flowchart of an exemplary method for multimodal biometric authentication, constructed and operative in accordance with another embodiment of the disclosed technique.

Reference is now made to FIG. 3, which shows a flowchart of an exemplary method for multimodal biometric authentication, constructed and operative in accordance with another embodiment of the disclosed technique. The exemplary method of FIG. 3 relates to biometric authentication based on two different biometric modalities. However, with the necessary changes, the method of FIG. 3 may be applied to a biometric authentication, which is based on more than two biometric modalities. In a step 300, a set of development supervectors may be provided. The development supervectors represent features of biometric samples of multiple subjects. The biometric samples may be of two different biometric modalities, a first and a second. Each supervector represents features of a biometric sample of the first or of the second modality and of a specific user. With reference to FIG. 2, a set of development supervectors relating to two different biometric modalities, e.g., voice and face, may be provided to common engine 260 and stored on storage medium 280.

In a step 320, a first and a second enrollment supervectors may be provided. The first and the second enrollment supervectors represent features of a first and of second enrollment biometric samples of a target subject correspondingly. The first and the second enrollment samples may be of the first and the second biometric modalities correspondingly. With reference to FIG. 2, user 210 performs enrollment with system 260 by providing two or more enrollment biometric samples. For example, user 210 may provide a voice sample via front-end device 220A and a face sample (i.e., face image) via front-end device 220B. The enrollment samples may be stored in storage medium 250A and 250B correspondingly. Processors 240A and 240B may then utilize a designated software to pre-process the received samples and extract features from each sample correspondingly. Processors 240A and 240B may them utilize the software (or a further designated software) to generate a first and a second enrollment supervectors, representing the features extracted from each sample correspondingly. Thus, front-end device 220A may generate a first enrollment vector representing the features of the voice sample of user 210 and may provide the supervector to common engine 260. Front-end device 220B may generate a second enrollment supervector representing the features of the face sample of user 210 and may provide the supervector to common engine 260. The enrollment supervectors may be stored in storage medium 280 of common engine 260.

In a step 340, a first and a second verification supervectors may be provided. The first and the second verification supervectors represent features of a first and a second verification biometric samples of the target subject correspondingly. The first and the second verification samples may be of the first and the second biometric modalities correspondingly. With reference to FIG. 2, user 210 requests to identify himself via system 260 by providing two or more verification biometric samples. For example, user 210 may provide a voice verification sample via front-end device 220A and a face verification sample via front-end device 220B. The verification samples may be stored in storage mediums 250A and 250B correspondingly. Processors 240A and 240B may then utilize a designated software to pre-process the received samples and extract features from each sample correspondingly. Processors 240A and 240B may them utilize the software (or a further designated software) to generate a first and a second verification supervectors, representing the features extracted from each sample correspondingly. Thus, front-end device 220A may generate a first verification vector representing the features of the voice sample of user 210 and may provide the first verification supervector to common engine 260. Front-end device 220B may generate a second verification supervector representing the features of the face sample of user 210 and may provide the second verification supervector to common engine 260. The verification supervectors may be stored in storage medium 280 of common engine 260.

In a step 360, the development supervectors may be concatenated to a single development generic supervector. The first and the second enrollment supervectors may be concatenated to a single enrollment generic supervector. The first and the second verification supervectors may be concatenated to a single verification generic supervector. Thus, each generic supervector represents features of biometric samples of the target user relating to two different biometric modalities. With reference to FIG. 2, processor 270 may utilize a designated software to concatenate the development, enrollment and verification supervectors stored in storage medium 280 accordingly. The concatenated supervectors may be also stored in storage medium 280.

In a step 380, an identity of the target subject may be verified. The verification may be done by performing modeling and scoring. The verification may be based on a fused score calculated for the verification generic supervector. The fused score may be calculated based on the enrollment generic supervector and the development generic supervectors (i.e., a set of development generic supervectors). The calculation of the fused score may be performed by training a classifier for the target subject based on the set of development generic supervectors and the enrollment generic supervector (i.e., modeling) and applying the classifier on the verification generic supervector to receive the fused score (i.e., scoring). Alternatively, a common classifier may be trained based on the set of development generic supervectors alone. In such a case, the verification generic supervector may be compared to the generic enrollment supervector based on the classifier.

With reference to FIG. 2, processor 270 utilized a designated software to calculate the fused score for the verification generic supervector and determine if an identity of user 210 may be verified. If the identity is verified, then processor 270 may issue a positive authentication notice. If the identity may not be verified, then processor 270 may issue a positive authentication notice.

One or more appropriate machine learning methods known in the art, such as Probabilistic Linear Discriminant Analysis (PLDA), Support Vector Machines, joint factor analysis and deep belief networks (DBNs) may be used to train a classifier and perform scoring. This may be done by applying appropriate known in the art machine learning algorithms which may be suitable for the biometric setup (one or few positive training examples, many negative training examples, availability of a development set). These methods usually use the development set to model typical (not user specific) intra-user variability and to use it for target-users authentication.

The generic supervectors, representing features of different modalities, allow the application of multi-view approaches in scoring by learning the correlations between the features from the different modalities. Thus, correlations between features of different modalities and for different target users (e.g., males vs. females) may be identified and modeled, and then used for classifying and calculating of a fused score for the verification generic supervector, therefore for verifying an identity of the target user. Furthermore, such a multi-view approach may allow identifying statistical significance. For example, per a specific user, facial features may provide better identification than vocal features. Thus, facial features show a higher significance for the specific user. Such information may be utilized in calculating the fused score by, for example, by granting a lower weigh to vocal feature or higher to the facial ones.

In addition, score normalization, confidence estimation, goat detection (detection of persons which may be hard to identify) and policy management may be performed in a modality-independent manner.

Mapping of biometric samples of different biometric modalities to a supervector space, i.e., by generating supervectors, each representing the features of each sample, may be preformed according to methods known in the art. For example, for voice samples, techniques such as supervector extraction or i-vector extraction may be used. For face recognition one may use standard image processing techniques such as LBP to represent and normalize face images. Similar methods may be used for fingerprints using appropriate metrics (Hamming for instance). Furthermore, mapping of samples of various biometric modalities may be performed according to the method for generic mapping of vectors to a supervector space, which is disclosed herein below (see FIG. 4). In particular, for chirographic samples, one may use the proposed method for mapping of a chirographic input to a supervector space as shown in FIG. 5 and disclosed herein below.

Generic Mapping of a Biometric Input to a Supervector Space

Figure 4:
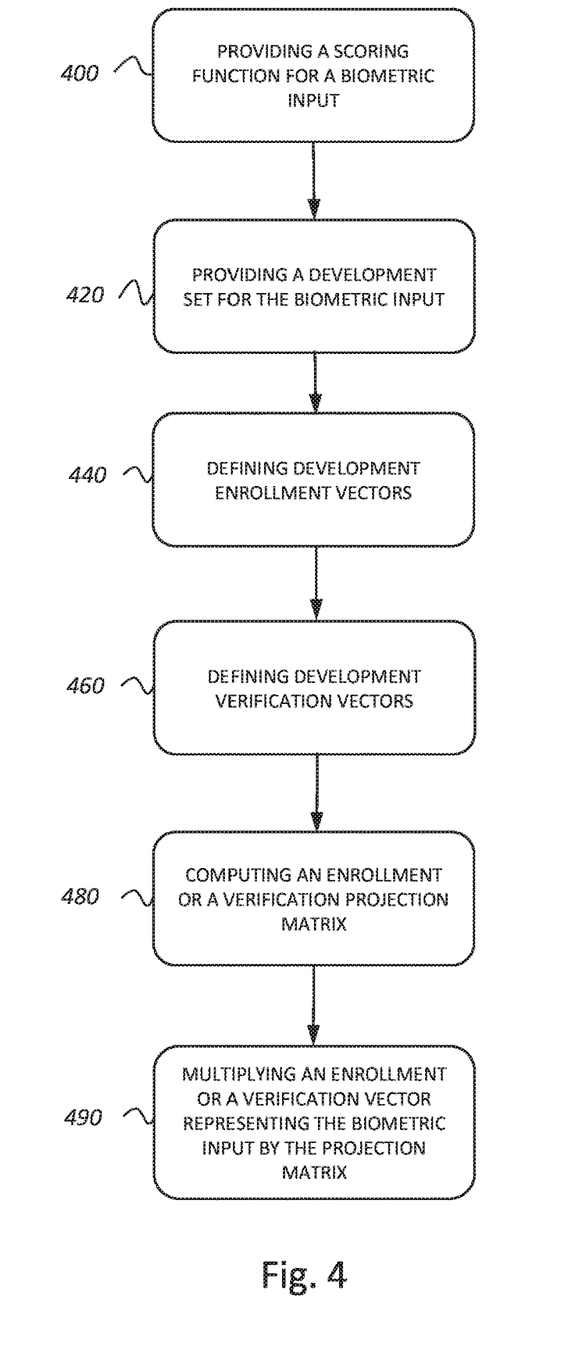
FIG. 4 shows a flowchart of a method for generic mapping of an enrollment or a verification vector representing a biometric input to a supervector space, constructed and operative in accordance with a further embodiment of the disclosed technique.
Figure 5:
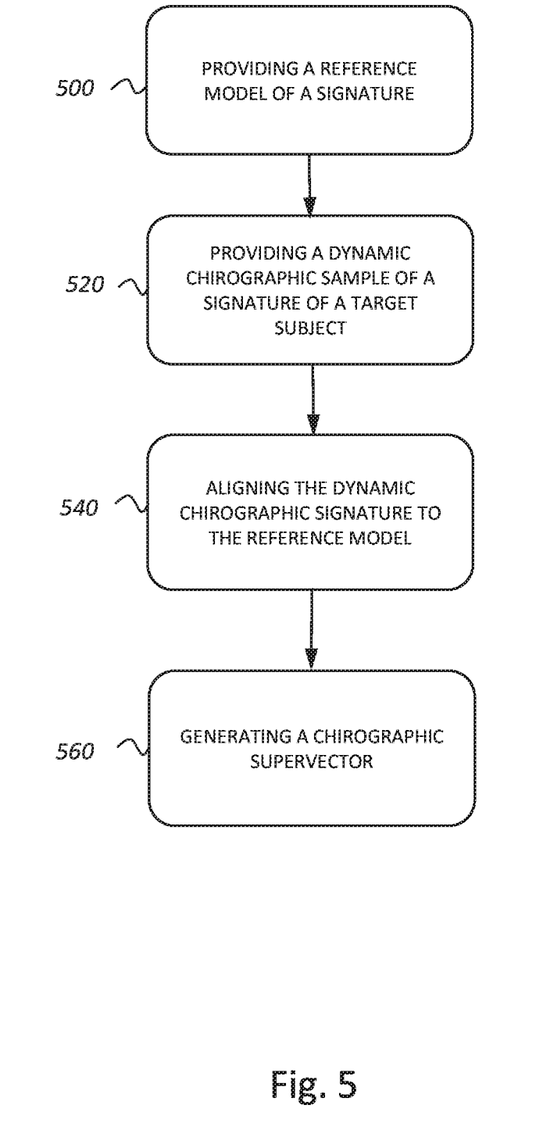
FIG. 5 shows a flowchart of a method for mapping of a dynamic chirographic input to a supervector space, constructed and operative in accordance with another embodiment of the disclosed technique.

FIG. 4 shows a flowchart of a method for generic mapping of an enrollment or a verification vector, representing a biometric input, to a supervector space, constructed and operative in accordance with a further embodiment of the disclosed technique.

In a step 400, a scoring function for the biometric input (i.e., a biometric sample) of a specific biometric modality may be provided. The scoring function may be configured to receive an enrollment sample and a verification sample of the biometric modality and provide a score. The scoring function may be denoted as s(x, y), while x denotes an enrollment sample and y denotes a verification sample. Known biometric engines, providing verification of an identity of a user (i.e., by providing a score) based on an enrollment sample and a verification sample of a specific biometric modality, may be used as a scoring function for the specific biometric modality according to the disclosed technique.

In a step 420, a development set for the biometric input (i.e., of the biometric modality of the biometric input) may be provided. The development set may include a plurality of development enrollment samples, which may be denoted as $\{x_i\}$ (i is the index), and a plurality of development verification samples which may be denoted as $\{y_j\}$ (j is the index), of a plurality of subjects.

In a step 440, development enrollment vectors may be defined, which may be denoted as $\{E(i)\}$. Each development enrollment vector includes scores provided by the scoring function for one development enrollment sample of the plurality of development enrollment samples and each development verification sample of the plurality of development verification samples. Thus, a development enrollment vector may be generated for each development enrollment sample $x_i$ and may be denoted as $E(i)=\{s(x_i, y_1), s(x_i, y_2), \ldots, s(x_i, y_j)\}$.

In a step 460, development verification vectors may be defined, which may be denoted as $\{V(j)\}$. Each development verification vector includes scores provided by the scoring function for one development verification sample of the plurality of development verification samples and each development enrollment sample of the plurality of development enrollment samples. Thus, a development verification vector may be generated for each development verification sample $y_j$ and may be denoted as $V(j)=\{s(x_1, y_j), s(x_2, y_j), \ldots, s(x_i, y_j)\}$.

In a step 480, an enrollment or a verification projection matrix may be computed correspondingly, i.e., an enrollment projection matrix may be computed if mapping of an enrollment vectors is desired and a verification projection matrix may be computed if mapping of a verification vector is desired. The enrollment or the verification projection matrix represents a linear projection of an enrollment or a verification vector correspondingly to a linear supervector subspace. This may be performed by applying Linear Discriminant Analysis on a between class covariance matrix and on a within class covariance matrix of the development enrollment vectors or of the development verification vectors correspondingly.

In a step 490, the enrollment or verification vector may be multiplied by the enrollment or verification projection matrix correspondingly to receive an enrollment or verification supervector correspondingly representing the biometric input in the supervector space.

In a further optional step, an enrollment vector may be generated from the enrollment sample. The enrollment vector may include scores provided by the scoring function for the enrollment sample and development verification samples.

In another optional step, a verification vector may be generated from the verification sample. The verification vector may include scores provided by the scoring function for the verification sample and development enrollment samples.

In a further optional step, a development set of supervectors may be generated. The development set of supervectors includes development enrollment supervectors and development verification supervectors. The development enrollment supervectors may be generated by multiplying each of the development enrollment vectors by the projection matrix of the development enrollment vectors. Each of the received development enrollment supervectors represents each of the development enrollment samples in the subspace. The development verification supervectors may be generated by multiplying each of the development verification vectors by the verification projection matrix. Each of the received development verification supervectors represents each of the development verification samples in the subspace. The development enrollment supervectors and development verification supervectors may be arranged to receive a development set of supervectors.

In another optional step, a verification of an identity of a target user may be performed. If one or more enrollment vectors and one or more verification vectors representing one or more enrollment biometric inputs and one or more verification biometric inputs of the target user correspondingly may be provided, then enrollment supervectors, verification supervectors and a development set of supervectors may be generated according to the disclosed technique. The generated enrollment supervectors, verification supervectors and a development set of supervectors may be provided to a multimodal biometric system according to the disclosed technique for verifying an identity of the target subject. The one or more enrollment inputs and the one or more verification inputs may be of different biometric modalities.

Mapping of a Chirographic Input to a Supervector Space

In a chirographic authentication, a single instance may be a variable-length time series with no obvious mapping to a vector space, and any apparent distance function or kernel. A method to map each such chirographic instance into a vector space with an explicit metric is introduced.

FIG. 5 shows a flowchart of a method for mapping of a dynamic chirographic input to a supervector space, constructed and operative in accordance with another embodiment of the disclosed technique. Although the method is described with respect to a signature, it may be applied on any other chirographic input with the necessary modifications, which will become apparent to those of skill in the art.

In a step 500, a reference model of a signature may be provided (i.e., a reference signature). In an optional step, a Universal-Background-Signature (UBS), may be estimated and used as the reference signature. The estimation of the UBS may be based on a provided development set, which includes a plurality of dynamic signature samples of a plurality of subjects.

The estimation of the UBS may be performed according to the following steps. The UBS may be set to a predefined length in terms of time. The plurality of dynamic signature samples of the development set may be linearly segmented to achieve the predefined time length. An initial UBS may be estimated based on the linearly segmented plurality of dynamic chirographic samples. The estimation may be performed with respect to various parameters of a dynamic signature as known in the art, and such as the direction of the pen used to sign, the pressure applied on the pen or the spatial location of the pen as a function of time. The UBS may be iteratively refined (i.e., the parameters of the UBS) by utilizing an Expectation-Maximization (EM) algorithm.

The iteratively refinement of the UBS may be performed by the following steps. An initial estimation of the UBS may be provided. A Maximum Likelihood (ML) segmentation may be iteratively calculated for each dynamic chirographic sample of the plurality of dynamic chirographic samples of the development set based on the DTW algorithm. The UBS may then be estimated iteratively based on the calculated ML segmentation.

In a step 520, a dynamic chirographic sample of a signature of a target subject may be provided. Such sample may be a variable-length time series. Such sample may be provided, for example, by utilizing a digital pen and paper.

In a step 540, the dynamic chirographic signature of the target subject may be aligned to the reference model, optionally to the UBS, by using well known techniques such as Dynamic Time Warping (DTW).

In a step 560, a chirographic supervector may be generated based on the aligned dynamic chirographic signature of the target subject and by utilizing the DTW algorithm. The generated supervector represents features of the dynamic chirographic signature of the target subject mapped in a vector space having a fixed dimension with a natural Euclidean mapping. The supervector may be generated by aligning the features of the signature to the UBM in the time domain. The aligned time series may be sampled in a fixed resolution to create a vector with a fixed dimension by concatenating the features for different timestamps.

The method of FIG. 5 may be applied to any chirographic input and not just of a target subject, including samples (i.e., inputs) of a development set in order to generate a development supervector.

A chirographic supervector according to the disclosed technique may be generated by a multimodal system according to the disclosed technique, such as multimodal system 100 of FIG. 2. For example, processor 240C may utilize a designated software stored on storage medium 250C to generate a chirographic supervector from a dynamic chirographic input of user 210 obtained by sensor C, which may include, for example, a digital pen and a digital paper. The chirographic supervector may be then provided to common engine 260 in order to verify an identity of user 210. Common engine 260 may model and score the chirographic supervector in the generic manner disclosed herein above (FIG. 3) as may be performed with inputs of different modalities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for:
   (a) providing a set of development supervectors representing features of development biometric samples of multiple subjects, the development biometric samples being of at least a first and a second different biometric modalities;
   (b) providing at least a first and a second enrollment supervectors representing features of at least a first and a second enrollment biometric samples of a target subject correspondingly, wherein the target subject is not one of the multiple subjects, and wherein the at least first and second enrollment biometric samples are of the at least first and the second different biometric modalities correspondingly;
   (c) providing at least a first and a second verification supervectors representing features of at least a first and a second verification biometric samples of the target subject correspondingly, wherein the at least first and second verification biometric samples are of the at least first and second different biometric modalities correspondingly;
   (d) concatenating the development supervectors to a set of development generic supervectors, the at least first and second enrollment supervectors to a single enrollment generic supervector and the at least first and second verification supervectors to a single verification generic supervector; and
   (e) verifying an identity of the target subject based on a fused score calculated for the verification generic supervector, wherein the fused score is calculated based on the enrollment generic supervector and the set of development generic supervectors,
   wherein each of the development supervectors, the enrollment supervectors, and the verification supervectors is a vector in a high-dimensional vector space on which a distance is defined, and
   further comprising calculating each of the verification supervectors by multiplying a verification projection matrix by a verification vector, wherein the verification projection matrix represents a linear projection of the verification vector to a linear supervector subspace, and wherein the verification vector represents the verification biometric samples.

2. The method of claim 1, wherein the verifying of an identity of the target subject comprises:
   training a classifier for the verification generic supervector based on the set of development generic supervector; and
   applying the classifier on the verification generic supervector to receive said calculated fused score.

3. The method of claim 2, wherein said training of the classifier is performed by using one or more machine learning methods.

4. The method of claim 3, wherein the one or more machine learning methods is selected from the group consisting of: Probabilistic Linear Discriminant Analysis (PLDA), Support Vector Machines, joint factor analysis and deep belief networks (DBNs).

5. The method of claim 2, wherein the training of the classifier comprises learning correlations between said features of said biometric samples of said first and second biometric modalities.

6. The method of claim 2, wherein the training and the applying of the classifier comprise identifying statistical significance of said features of said first and second enrollment biometric samples of said first and second biometric modalities correspondingly of said target subject.

7. The method of claim 1, wherein:
the at least first and second different biometric modalities comprises three different biometric modalities,
the at least first and second enrollment supervectors comprises three enrollment supervectors representing features of three enrollment biometric samples of the target subject, and
the at least first and second verification supervectors comprise three verification supervectors representing features of three verification biometric samples.

8. The method of claim 1, wherein the biometric modality is selected from the group consisting of: chirography, face, voice, and fingerprint.

9. The method of claim 1, further comprising calculating each of the development supervectors by multiplying a development projection matrix by a development vector, wherein the development projection matrix represents a linear projection of the development vector to a linear supervector subspace, and wherein the development vector represents the development biometric samples.

10. The method of claim 1, further comprising calculating each of the enrollment supervectors by multiplying an enrollment projection matrix by an enrollment vector, wherein the enrollment projection matrix represents a linear projection of the enrollment vector to a linear supervector subspace, and wherein the enrollment vector represents the enrollment biometric samples.

* * * * *